(12) United States Patent
Ansari et al.

(10) Patent No.: US 9,010,176 B2
(45) Date of Patent: Apr. 21, 2015

(54) SCOUR SENSOR AND METHOD OF USING SAME

(75) Inventors: Farhad Ansari, Naperville, IL (US); Amirhossein Iranmanesh, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 600 days.

(21) Appl. No.: 13/143,310

(22) PCT Filed: Jan. 8, 2010

(86) PCT No.: PCT/US2010/020491
§ 371 (c)(1),
(2), (4) Date: Jul. 5, 2011

(87) PCT Pub. No.: WO2010/080993
PCT Pub. Date: Jul. 15, 2010

(65) Prior Publication Data
US 2011/0265547 A1 Nov. 3, 2011

Related U.S. Application Data

(60) Provisional application No. 61/143,474, filed on Jan. 9, 2009.

(51) Int. Cl.
*G01N 17/00* (2006.01)
*G01C 13/00* (2006.01)
*G01C 25/00* (2006.01)

(52) U.S. Cl.
CPC .............. *G01C 13/00* (2013.01); *G01C 25/00* (2013.01)

(58) Field of Classification Search
CPC ........................................................ G01C 13/00
USPC ........................................................ 76/86, 594
See application file for complete search history.

(56) References Cited

U.S. PATENT DOCUMENTS 6,100,700 A * 8/2000 Yankielun et al. ............. 324/534
6,526,189 B1 * 2/2003 Yankielun ....................... 385/12
(Continued)

FOREIGN PATENT DOCUMENTS

JP 55-164308 A 12/1980
JP 11-271057 A 10/1999
(Continued)

OTHER PUBLICATIONS

D.C. Hayes and F.E. Drummond; "Use of Fathometers and Electrical-Conductivity . . . "; Report, reprinted from the collection of the University of Michigan Library, digitized by Google Books; 1995; 26 pages; US Geological Survey, Water-Resources Investigations Report 94-4164.

(Continued)

*Primary Examiner* — Hezron E Williams
*Assistant Examiner* — David Z Huang
(74) *Attorney, Agent, or Firm* — Reinhart Boerner Van Deuren P.C.

(57) ABSTRACT

A scour sensor and method of detecting scour in the bed of a body of water as well as a sensor and method for determining the subgrade modulus of a subgrade are provided. The scour sensor includes an elongated rod that can be driven into the bed of a body of water such that a portion of the rod is cantilevered from the bed into the water. The rod has a known dynamic characteristic that is variable depending on the amount of the rod that is embedded in the subgrade. In one implementation, the known characteristic is the natural frequency of the rod. The scour sensor further includes a sensor element for monitoring a dynamic characteristic of the rod. Methods of using and calibrating a scour sensor are also provided. Further, the sensor may be used to determine a subgrade modulus of the subgrade.

13 Claims, 12 Drawing Sheets

(56) References Cited

U.S. PATENT DOCUMENTS

| | | | |
|---|---|---|---|
| 6,909,669 B1 * | 6/2005 | Yankielun et al. | 367/131 |
| 2004/0169132 A1 * | 9/2004 | Yankielun | 250/227.24 |

FOREIGN PATENT DOCUMENTS

| | | |
|---|---|---|
| JP | 2003-147746 A | 5/2003 |
| JP | 2004-163219 A | 6/2004 |

OTHER PUBLICATIONS

Civil Structural Health Monitoring Workshop (CSHM) UIC 2004; "Sensing Issues in Civil Structural Health Monitoring"; Synthesis of the work of the three committees of the workshop; North American Euro-Pacific Workshop; Nov. 10-13, 2004; 16 pages; CSHM, Oahu, Hawaii.

Leonard J. Zabilansky; "Ice Force and Scour Instrumentation for the White River, Vermont", Apr. 1996, 59 pages; US Army Corps of Engineers, Cold Regions Research & Engineering Laboratory.

N.E. Yankielun and L. Zabilansky; "Laboratory Investigation of Time-Domain . . . "; Journal; Dec. 1999; 6 pages; Journal of Hydraulic Engineering.

P.F. Lagasse et al.; NCHRP 396: Instrumentation for Measuring Scour at Bridge Piers and Abutments; Report; 1997; 120 pages; National Cooperative Highway Research Program, NCHRP Report 396, Transportation Research Board, national Research Council.

Yung Bin Lin et al.; "Flood Scour Monitoring System Using Fiber Bragg Grating Sensors"; Article; 2006; 10 pages; Institute of Physics Publishing, Smart Materials and Structures 15 (2006) 1950-1959.

N. E. Yankielun and L. Zabilansky; "Laboratory Investigation of Time-Domain . . . ", Article; Dec. 1999; 6 pages; Journal of Hydraulic Engineering.

Robert R. Mason, Jr. and D. Max Sheppard; "Field Performance of an Acoustic . . . "; 1994; 10 pages, pp. 366-375.

National Cooperative Highway Research Program; "Instrumentation for Measuring Scour . . . "; 1993; 8 pages; NCHRP Research Results Digest No. 189, Transportation Research Board National Research Council.

S. R. Gorin and F. P. Haeni; "Use of Surface-Geophysical . . . "; 1989; 35 pages; US Geological Survey, Water-Resources Investigations Report 88-4212.

Beatrice E. Hunt, P.E., M.Asce and Gerald R. Price; Scour Monitoring—Lessons Learned; Nov. 14-17, 2004; 14 pages; Proceedings of Second International Conference on Scour and Erosion, Meritus Mandarin, Singapore.

* cited by examiner

SCOUR SENSOR AND METHOD OF USING SAME

FIELD OF THE INVENTION

The present invention relates to sensors and more particularly to sensors for monitoring scour of the bed of bodies of water as well as determining the subgrade modulus of a subgrade.

BACKGROUND OF THE INVENTION

Scour is considered one of the major causes of highway bridge failures in the United States. It is especially prevalent during floods and periods of rapid river flow activities. During floods, erosion of the foundation materials around and below the bridge piers causes structural instability. This process is dynamic, where erosion takes place near the peak flow rates, and deposition of sediments occur during the descending stages of the flood. If local scour is not identified in time, the structural integrity of the foundation progressively deteriorates and leads to severe damage and collapse of the bridge.

According to the data from the National Bridge Inventory (NBI), 484,546 highway bridges out of an inventory of 590,000 in the United States cross over waterways. Sixty percent of these bridges have been declared scour critical (Hunt and Price, 2003; Gee, 2003). The 1987 catastrophic collapse of the Schoharie Creek Bridge in New York State due to scour was one of the most severe bridge failures in the United States. Considering the consequences of scour damage, Federal Highway Administration (FHWA) issued a Technical Advisory in 1988 revising the National Bridge Inspection Standards (NBIS) to require evaluation of all bridges for susceptibility to damage resulting from scour. This issue is not only confined to the US boundaries. Local scour was identified as a high priority research need for infrastructure by the North American Euro Pacific Workshop for Sensing Issues in Civil Structural Health Monitoring (Ansari, 2004). Participants of this workshop comprised of government highway agency engineers as well as researchers from academia and industry from US and other countries.

Local scour is caused by the interference of bridge piers with the water flow and is characterized by the formation of scour holes resulting from clear-water scour or live-bed scour. Clear-water scour occurs when the bed materials upstream of the scour area is at rest. The maximum local scour depth is reached when the flow can no longer remove bed material from the scour area. Live-bed scour occurs when there is general sediment transport by the river.

A great amount of effort has been expended for the research and development of scour monitoring sensors and systems. Applicability of the existing methodologies however has been limited considering issues pertaining to the complexity and cost effectiveness, resolution, capability for providing repeated and reliable information, installation, and rigor in data retrieval and processing. The great amount of effort is illustrated by the wide array of methodologies that have been used in attempts to develop scour monitoring sensors. These methodologies include sonar (Mason et al., 1994; Hays et al., 1995), time domain reflectometry or TDR (Dowding et al., 1994; Yankielun et al., 1999), sliding collar (Lagasse et al., 1997; Richardson et al., 1994), radar (Gorin et al., 1989), piezoelectric (Lagasse et al., 1997), and the seismic transducer techniques (Zabilansky, 1996).

Radar and sonar based techniques have been successful in monitoring the scour depth after the flood event. However, their applicability for monitoring the scour event in real time has been limited and both techniques involve rigorous data processing and interpretation schemes. The information provided by battery operated devices including those based on neutral buoyancy of seismic transducers are crude and, in general, these devices have limited active lives. Buried mechanical devices such as magnetic collars are comparatively inexpensive. However, it is not possible to reset these devices for reuse and issues pertaining to binding and installations have hindered their usage. Techniques based on TDR either use sacrificial sensors that break off during scouring events or solely depend on the impedance mismatch and not practical for real applications involving various types of sedimentations. Attenuation and pulse dispersion errors due to length of electrical cables as well as probe length limitations are amongst other deficiencies of these systems. Sensors based on spatial positioning of PZT or fiber optic sensors (Bin et al., 2006) on a rod that can be driven into the sediment provide only incremental resolution. Moreover, these multi-sensor arrangements are expensive since they require sophisticated multi-channel data acquisition and interpretation techniques.

Therefore, none of the currently available scour monitoring techniques possesses the necessary attributes for widespread deployment in scour critical bridges. The desired device must be: accurate, simple in principle, easy to install and operate, simple to calibrate, cost effective and reliable. In addition, the sensor has to survive many floods and operate maintenance-free over a long period of time. These attributes provide the authorities with the necessary tools to make decisive actions for maintenance as well as securing the safety of the traveling public. The payoffs are significant in terms of tremendous cost savings for the federal and state highway agencies considering the current yearly levels of scour damage and bridge failure related expenditures.

Not withstanding the difficulty of determining scour, it can also be difficult to determine the subgrade modulus of the river bed, or the subgrade modulus for any soil or material for that matter, without unduly disturbing the material or affecting the soil or material once it has been placed in a desired location such as at a construction site.

BRIEF SUMMARY OF THE INVENTION

The present invention provides improved scour detection methodology and technology to overcome the problems in the art. In one embodiment, the present invention provides an improved scour sensor. In another embodiment, the present invention provides an improved method of monitoring scour of a bed of a body of water.

In one embodiment, the present invention provides a simple, reliable and cost effective scour monitoring system that is easily mass produced which will have a tremendous impact on the state of health of our bridges. Mass production and cost efficiency paves the way for rapid distribution to highway agencies and ensures safety. Furthermore, it assists the highway officials for scheduling periodical maintenance programs and circumvents costly repairs and bridge replacements as well as emergency road closures. These and other advantages of the embodiments of the invention, as well as additional inventive features, will be apparent from the description of the invention provided herein.

Embodiments of the new and improved scour sensor of the present invention is capable of monitoring scour depth. Embodiments of the scour sensor include a single sensor element. The sensor element may be based on any of the following principles: fiber optic, electrical strain gages, accelerometers, PZT sensors, wireless sensors and etc. The sensor element may be embedded inside or mounted to the surface of a rod which will then be cantilevered into the river bed. As scour initiates and develops, the length of the cantilevered rod, and thus the sensor, is altered. The length change of the cantilever rod due to scour is accompanied by a proportionate change in its dynamic characteristics, i.e. natural frequencies. In one embodiment, this change is measured from dynamic strain response of the sensor element. This change in natural frequency is independent of the flow rate and will be directly related to the scour depth.

To that extent, in one embodiment, a scour sensor for monitoring scour of a bed of a body of water is provided. The scour sensor includes an elongated rod and a sensor element mounted to the rod. The sensor element operably monitoring a desired dynamic characteristic of the rod, the desired dynamic characteristic varying depending on the amount of scour around the rod.

In one more particular embodiment, the sensor element operably monitors the dynamic characteristic of a natural frequency of the rod. In doing so, in one embodiment, the sensor element is a strain gage. Alternatively, the sensor element is an accelerometer.

In some embodiments, the elongated rod is between about 2 feet and 8 feet long, and longer and has a diameter of between about one-quarter inch and two inches to provide for measurable variations in the dynamic characteristics of the sensor. In other embodiments, the elongated rod is a solid aluminum rod to increase the corrosion resistance of the sensor and to provide reliable data. In further embodiments, the elongated rod is a friction pile. The sensor rod length is selected based on the site conditions and scour monitoring requirements. Sensor rod material can be metallic or otherwise per application requirements.

The sensor element may take the form of a Fiber Optic Bragg Grating Sensor in some embodiments.

Further yet, embodiments of the present invention may use only a single sensor element associated with the elongated rod. This reduces the amount information/data that must be analyzed as well as reduces the power required to operate the sensor which increases the usefulness of the sensor in remote locations.

A method of monitoring scour of a bed of body of water is also provided. In general, the method includes inserting an elongated rod of a scour sensor into a bed of the body of water; and monitoring changes in a dynamic characteristic of the elongated rod.

The step of monitoring changes in the elongated rod may include monitoring changes in a natural frequency of the rod.

Further, the step of inserting an elongated rod into a bed (soil sediments) of the body of water includes substantially cantilevering the elongated rod such that one portion of the rod is embedded within the bed of the body of water and another portion of the rod is fully submerged and exposed within the water of the body of water.

The step of monitoring changes in the elongated rod includes monitoring dynamic strain of the elongated rod and converting the dynamic strain into a frequency, or directly monitoring the frequency by way of an accelerometer or any other appropriate sensors. This monitoring may occur realtime.

A method of calibrating a scour sensor that is a rod partially embedded into a subgrade is also provided. The scour sensor has known physical properties. The method includes embedding a first portion of the scour sensor a predetermined benchmark depth into the subgrade; sampling a benchmark frequency of the scour sensor with the first portion of the scour sensor embedded at the predetermined benchmark depth; and selecting a calibration factor based on the sampled benchmark frequency of the scour sensor embedded at the predetermined benchmark depth.

In one method of calibrating, the step of embedding a first portion of the scour sensor includes leaving a second portion of the scour sensor unembedded and fully exposed to the medium above the subgrade and fully submerged within the medium.

In one method, the step of selecting a calibration factor includes comparing the sampled benchmark frequency to theoretical benchmark frequency data for the scour sensor, for various subgrades, each subgrade having a different subgrade modulus.

In various implementations of the calibration method, the theoretical benchmark frequency data is compensated for a medium exposed to a second portion of the scour sensor that is not embedded into the subgrade. Further yet, various methods may also include the step of performing finite element analysis on the scour sensor to establish the theoretical benchmark frequency data including determining the theoretical benchmark frequency of the scour sensor when the scour sensor is embedded in the various subgrades at varying benchmark depths.

Various methods may also include the step of calculating a correlation factor for the various subgrade moduli including the step of determining the change in the theoretical benchmark frequencies against the change in benchmark depth.

The step of determining theoretical benchmark frequency data includes modeling the scour sensor as a Winkler reaction spring system with known physical properties of the scour sensor.

A calibration factor may be determined by plotting the theoretical benchmark frequency data against the corresponding theoretical benchmark depths, the calibration factor being the change in theoretical benchmark frequency against the change in corresponding benchmark depth. The calibration factor can then be used with sensed vibration frequencies of the scour sensor to determine a change in the amount that the scour sensor is embedded in the subgrade. In some methods, calibration factor is multiplied with a change in frequency between a currently sensed frequency and the benchmark frequency to determine an amount of scour.

Some methods of calibrating include the step of determining theoretical benchmark frequency data for the scour sensor based on the scour sensor being theoretically embedded various depths into various subgrades having varying subgrade moduli, respectively. Again, the step of determining theoretical benchmark frequency data includes modeling the scour sensor as a Winkler reaction spring system with known physical properties of the scour sensor.

Further, methods may include the step of using the selected calibration factor with sensed vibration frequencies of the scour sensor to determine a change in the amount that the scour sensor is embedded in the subgrade. This may include multiplying the selected calibration factor with a change in sensed frequency, which is the difference between a currently sensed frequency and the benchmark frequency.

Various methods of calibrating may also include the step of calculating a calibration factor for each subgrade moduli by plotting the theoretical benchmark frequencies against the corresponding theoretical embedded depths of the scour sensor and then extracting the slope of a regression lines through the plotted theoretical data points for each subgrade moduli, respectively, as the calibration factor.

Various methods of calibrating may also include the step of using the theoretical benchmark frequency data to establish a calibration factor for the various subgrade moduli including the step of correlating the calibration factors relative to corresponding theoretical benchmark frequencies, the theoretical benchmark frequencies being the theoretical natural frequencies of the scour sensor embedded a benchmark depth in each of the various sub grade moduli.

In some methods, the step of correlating the calibration factors relative to a theoretical benchmark frequencies includes plotting the calibration factors against the theoretical benchmark frequencies.

A further method of determining scour of a subgrade using a scour sensor that is an elongated rod embedded into a subgrade is provided. The rod has known physical properties. The method includes embedding a first portion of the scour sensor a predetermined benchmark depth into the subgrade; sampling a benchmark frequency of the scour sensor with the first portion of the scour sensor embedded at the predetermined benchmark depth; sampling a current frequency of the scour sensor; and correlating a change in frequency, which is the difference between the current frequency and the benchmark frequency, into an amount of scour, which is a change in the depth that the scour sensor is embedded into the river bed relative to the predetermined benchmark depth. This change in depth can be above or below the benchmark depth of the river bed.

The step of correlating the change in frequency includes multiplying the change in frequency by a calibration factor corresponding to the subgrade.

Embodiments of the method may further include the step of determining the calibration factor based on the sampled benchmark frequency of the scour sensor.

In one method, the steps of sampling the benchmark frequency and the current frequency are performed by one of strain gage or an accelerometer.

In one method, the steps of sampling a current frequency of the scour sensor is performed substantially continuously.

A further method of determining scour of a subgrade using a scour sensor that is an elongated rod, having known physical properties, embedded into a subgrade is provided. The method includes embedding a first portion of the scour sensor a predetermined benchmark depth into the subgrade; sampling a benchmark value of a dynamic characteristic of the scour sensor while the first portion of the scour sensor is embedded at the predetermined benchmark depth; sampling a current value of the dynamic characteristic of the scour sensor; and correlating a change in the dynamic characteristic, which is the difference between the benchmark value of the dynamic characteristic and the current value of the dynamic characteristic, into an amount of scour, which is a change in the amount that the scour sensor is embedded into the river bed relative to the predetermined benchmark depth.

A method of determining a subgrade modulus using a sensor that includes a rod, having known physical properties, partially embedded into the subgrade is provided. The method includes embedding a first portion of the sensor a predetermined benchmark depth into the subgrade; sampling a benchmark frequency of the sensor with the first portion of the sensor embedded at the predetermined benchmark depth; and correlating the sampled benchmark frequency to a subgrade modulus. The benchmark frequency being an undisturbed frequency.

In one method, the step of correlating the sampled benchmark frequency to a subgrade modulus includes comparing the sampled benchmark frequency to theoretical benchmark frequencies for the sensor embedded in a plurality of subgrades having differing subgrade moduli. The theoretical benchmark frequencies are theoretical natural frequency values for the sensor embedded the benchmark depth in the various subgrades or at least subgrades having the same modulus value.

Embodiments of the method may further include the step of calculating the theoretical natural frequency values using finite element analysis of the sensor. In more particular embodiments, the finite element analysis models the sensor as a Winkler reaction spring system.

A sensor for determining the subgrade modulus of a subgrade is also provided. The sensor includes an elongated rod; a sensor element mounted to the rod, the sensor element operably sensing the undisturbed frequency of the rod when it is embedded into the subgrade; and a controller programmed to correlate frequency data from the sensor element into a subgrade modulus of the subgrade. In further embodiments, the controller is programmed with theoretical benchmark frequencies for the elongated rod embedded a benchmark depth in various subgrades having various subgrade moduli, respectively, and is configured to compare the data from the sensor element with the theoretical benchmark frequencies to determine a subgrade modulus of the subgrade in which the elongated rod is embedded.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
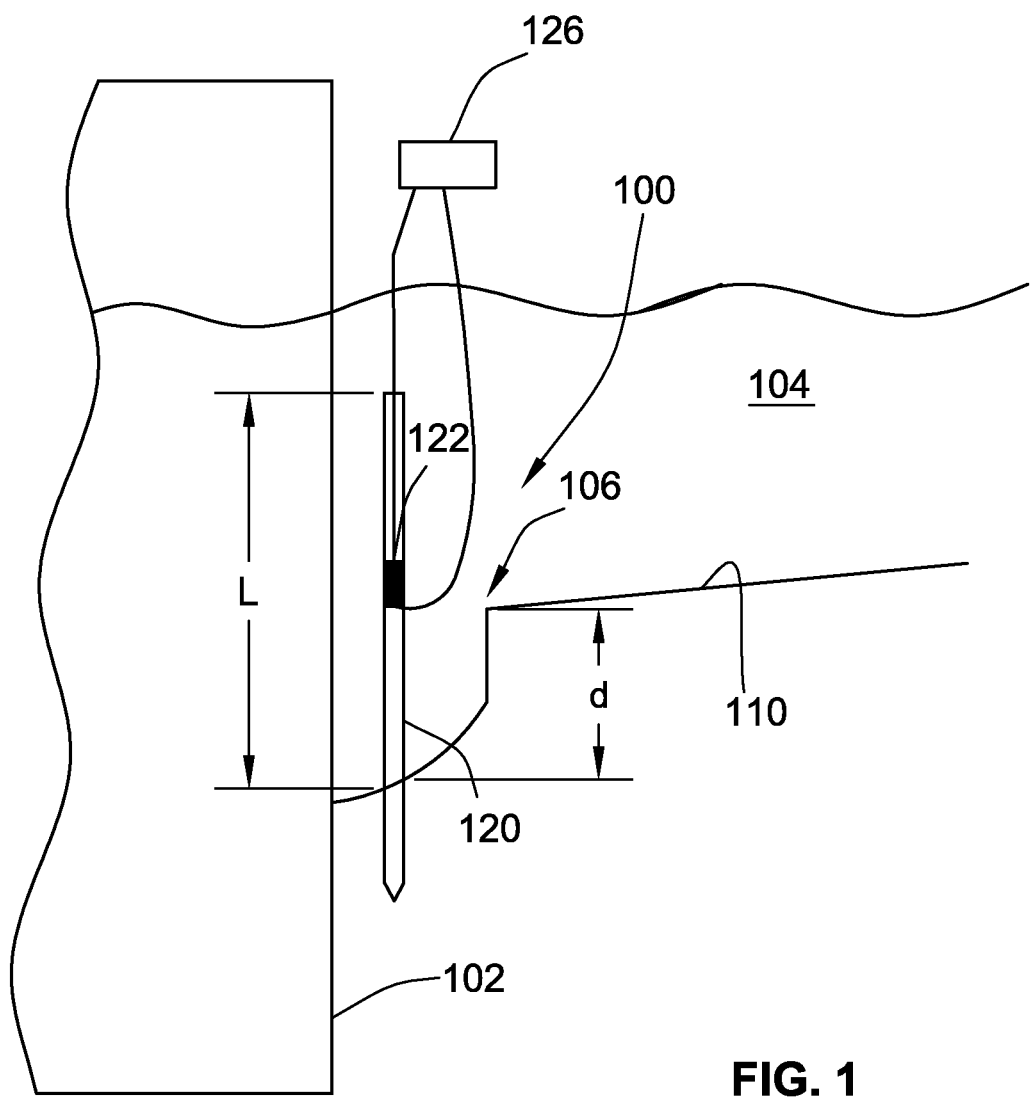
FIG. 1 is a schematic representation of a scour sensor according to an embodiment of the present invention installed proximate a structure formed within a body of water.

FIG. 1 illustrates a schematic representation of a scour sensor 100 according to an embodiment of the present invention installed proximate a structure 102 formed in a body of water 104. The scour sensor 100 monitors the depth (d) of scour 106 proximate structure 102. It should be noted that the depth (d) could actually be a measure of a height of deposition of material proximate the structure 102 and not necessarily a depth of removal of material depending on the type of scour that is occurring. Typically, the depth (d) of scour 106 is measured from the bed 110 of the body water 104. Thus, scour is the change in the amount of depth (plus or minus) that the scour sensor 100 is embedded into the bed 110.

Figure 2:
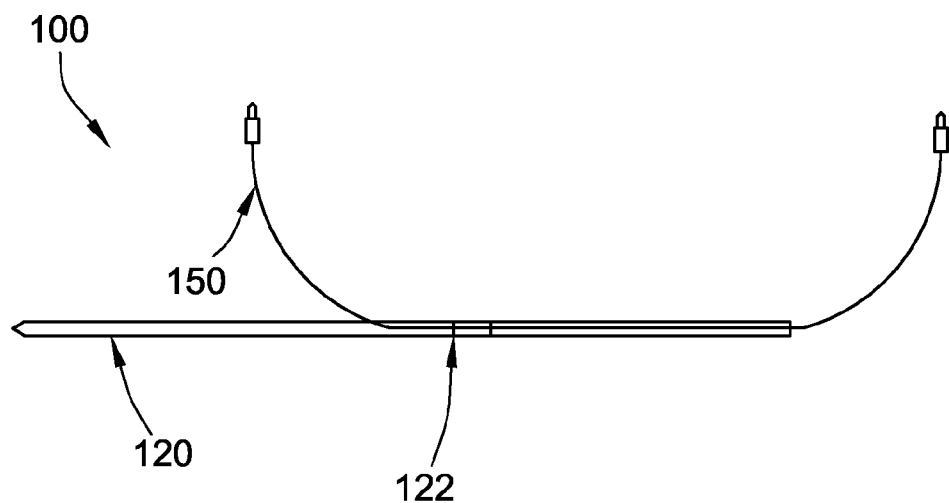
FIG. 2 is a simplified schematic representation of the scour sensor of FIG. 1.

With supplemental reference to FIG. 2, the sensor 100 generally includes an elongated rod 120 driven into bed 110 of the body of water 104 such that a portion of the rod 120 extends out of and above bed 110 and a portion is embedded into the river bed 110. Due to resistance by the soil of the bed 110, the rod 120 is substantially cantilevered out of the bed 110, however this particular arrangement will be more fully discussed below. A sensor element 122 (also referred to herein generally as sensor 122) is operably coupled to rod 120 for monitoring characteristics of the rod 120. The sensor 122 is then coupled to coupled to a data acquisition system 126 for reading and manipulating the signals produced by the sensor 122. The data acquisition system 126 can therefore be used to monitor the change in characteristics of the scour sensor 110 and, particularly, rod 120 due to changes in the depth (d) of scour 106.

With supplemental reference to FIG. 2, the sensor 100 generally includes an elongated rod 120 driven into bed 110 of the body of water 104 such that a portion of the rod 120 extends out of and above bed 110 and a portion is embedded into the river bed 110. Due to resistance by the soil of the bed 110, the rod 120 is substantially cantilevered out of the bed 110, however this particular arrangement will be more fully discussed below. A sensor element 122 (also referred to herein generally as sensor 122) is operably coupled to rod 120 for monitoring characteristics of the rod 120. The sensor 122 is then coupled to coupled to a data acquisition system 126 for reading and manipulating the signals produced by the sensor 122. The data acquisition system 126 can therefore be used to monitor the change in characteristics of the scour sensor 110 and, particularly, rod 120 due to changes in the depth (d) of scour 106. The data acquisition system 126 can be connected to the sensor element 122 by one or more cables 150.

As the depth (d) of scour 106 initiates and develops, the dynamic characteristics of rod 120, i.e. natural frequencies, similarly change. This change in dynamic characteristic is measured by the sensor element 122. This changes in dynamic characteristics of the rod are independent of the flow rate of water body 104 and are directly related to the scour depth (d).

While illustrated in FIG. 1 as being used to monitor scour of a river bed 110, the instant sensor 100 and theories discussed herein can also be used to determine a subgrade modulus for soil without knowing anything about the soil, which can find applicability in other fields generally, such as construction.

Initial Theory and Sensor Calibration

Now that the basic structure of the scour sensor 100 is described, the technical background relating to the scour sensor 100 and development of the scour sensor 100 will be described.

The natural frequency of a submerged rod driven into the river bed soil is resultant of interaction of river water, riverbed soil and the rod. If the effect of water and soil is ignored the natural frequency of a cantilevered rod with a circular section and uniform distributed mass is calculated through the following formula:

$$f = 0.14 \frac{d}{L^2} \sqrt{\frac{E}{\rho}}$$

In this formula, d and L are the rod diameter and length, E is the rod material modulus of elasticity and $\rho$ is the rod density.

When the effect of water as an interacting fluid is considered, the natural frequency of a cantilevered rod submerged in a fluid with $\rho_w$ density becomes:

$$f = 0.14 \frac{d}{L^2} \sqrt{\frac{E}{\rho + \rho_w}}$$

Thus, the primary effect of the surrounding fluid on the natural frequency of a symmetric structure in the fluid is simply to increase the effective mass.

Figure 3:
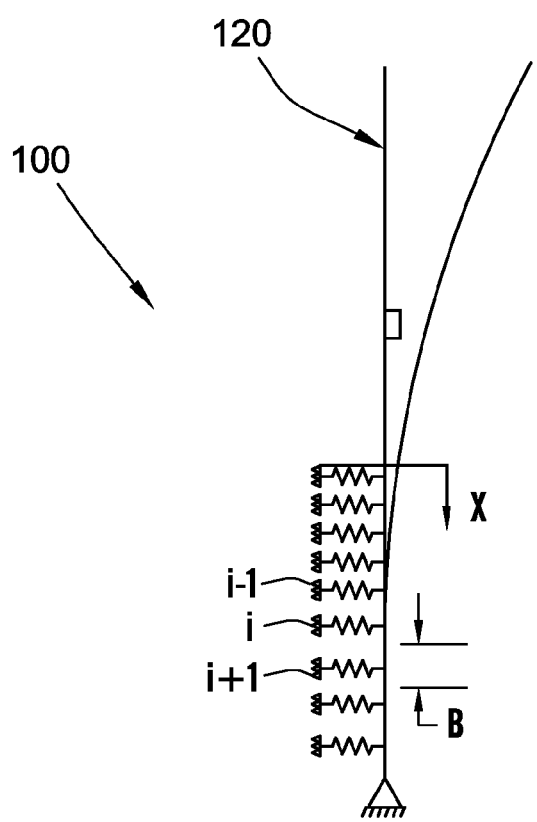
FIG. 3 is a schematic representation of a Winkler reaction spring system used to model the rod of the scour sensor of FIG. 1 in the installed condition within a subgrade.

However, in reality a rod driven into the soil does not act as a perfectly fixed cantilever. Therefore the flexibility of the rod and the surrounding soil should be modeled properly in the modal analysis. With reference to the schematic representation in FIG. 3, the Winkler reaction spring system for lateral support by the surrounding soil of rod 120 can be assumed for this purpose. Discrete soil spring stiffness $K_i$ at depth $z_i$, as shown in FIG. 3, can be determined for a given tributary length $B_i$ of the rod 120 calculated through the following formula:

$$K_i = k^* z_i B_i$$

Values for k* can be obtained from the geotechnical literature in relationship to Young's modulus or subgrade modulus of the soil, which in turn can be found (although with significant variability) from standard penetration tests, shear wave velocity measurements, or direct bearing tests carried out by an experienced geotechnical engineer. The natural frequency of a rod with above conditions as well as the sensor calibration factor is considerably sensitive to the value of k*.

In one technique, calibration can be provided by finite element based calibration procedure. Using the finite element based calibration procedure, the calibration factor for a certain design of sensor 100 can be computed regardless of measuring or knowing subgrade moduli k*.

This is particularly useful because manually calibrating a scour sensor 100 in the site of use, namely in a subgrade such as the bed of body of water 104, requires soil removal from bottom of the rod 120 in certain lengths which is tremendously difficult, impractical and sometimes impossible. The procedure would involve embedment of the sensor rod in the river bed soil and removal of predetermined levels of soil. The calibration curve determined in this manner may be represented by a sensor frequency change for various levels of scour depth.

To eliminate the issues involved in the manual calibration procedure requiring removal of river bed soil under moving water, the proposed calibration method takes advantage of numerical modeling through a hybrid approach. The method involves finite element modeling as well as a benchmark measurement of the sensor dynamics at the time of installation and or first embedment of the sensor rod 120 in the subgrade, e.g. river bed 110.

An added benefit of avoiding having to remove soil from around the rod 120 is that in many installations it is desirous to avoid disturbing, as much as possible, the subgrade in which the sensor 100 is installed.

Finite Element Modeling of the Scour Sensor

To calibrate the scour sensor 100, a finite element model of the submerged rod 120 where given lengths of rod is embedded inside the river bed 110 is constructed using commercial software (ANSYS). For given sensor rod 120 design parameters, i.e. material, diameter, shape, embedded length in the river bed, total length, etc. it is possible to perform modal analysis. Modal analysis provides the dynamic characteristics of the submerged vibrating rod 120 such as the natural frequency of the rod 120 under submerged conditions, and the modal shapes of the rod 120.

As discussed earlier, modeling of the river bed soil 110 requires measurement of the subgrade modulus k*. The analysis instead was performed for a range of subgrade moduli k* values from 5 to 400 lb/in$^3$, which covers a large range from loose and medium all the way to stiff soils.

Figure 4:
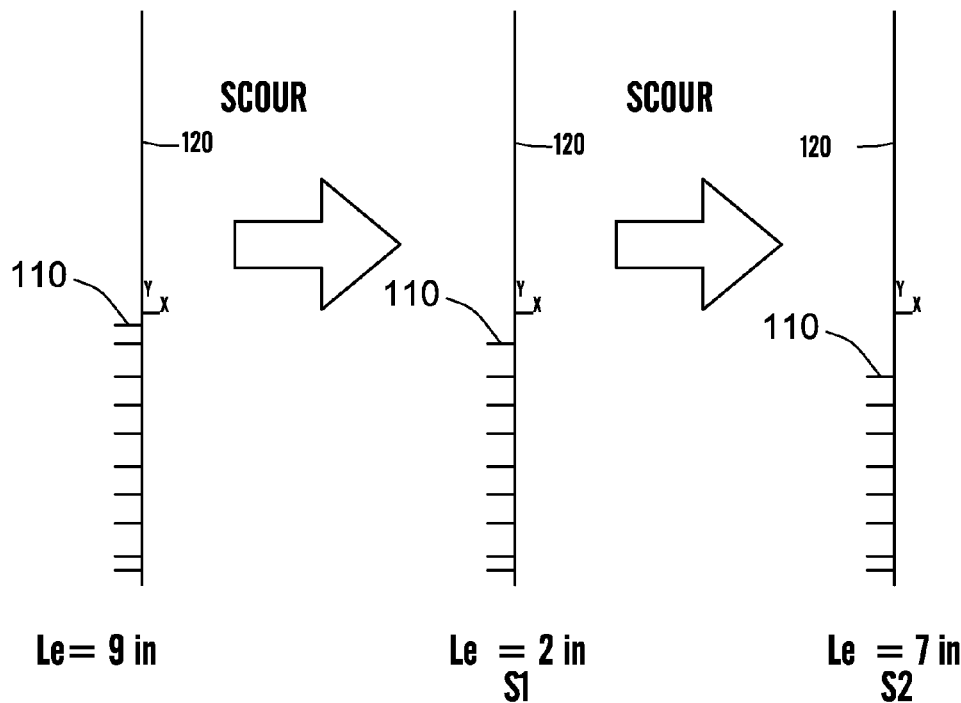
FIG. 4 is representation of various embedment lengths for performing initial finite analysis testing of a rod for determining a calibration coefficient of a scour sensor according to the teachings of the present invention.

The finite element model is shown in FIG. 4, which represents a sensor with a total length of 6 feet. The reference point for the coordinate system (xy) is placed at the hypothetical level of the riverbed 110 (i.e. where half of the rod is embedded in the river bed 110), such that the rod 120 would be inserted 3 feet into the river bed. Points below the reference point (embedded section) are modeled with a number of springs with the stiffness representing the subgrade modulus (k*).

Figure 14:
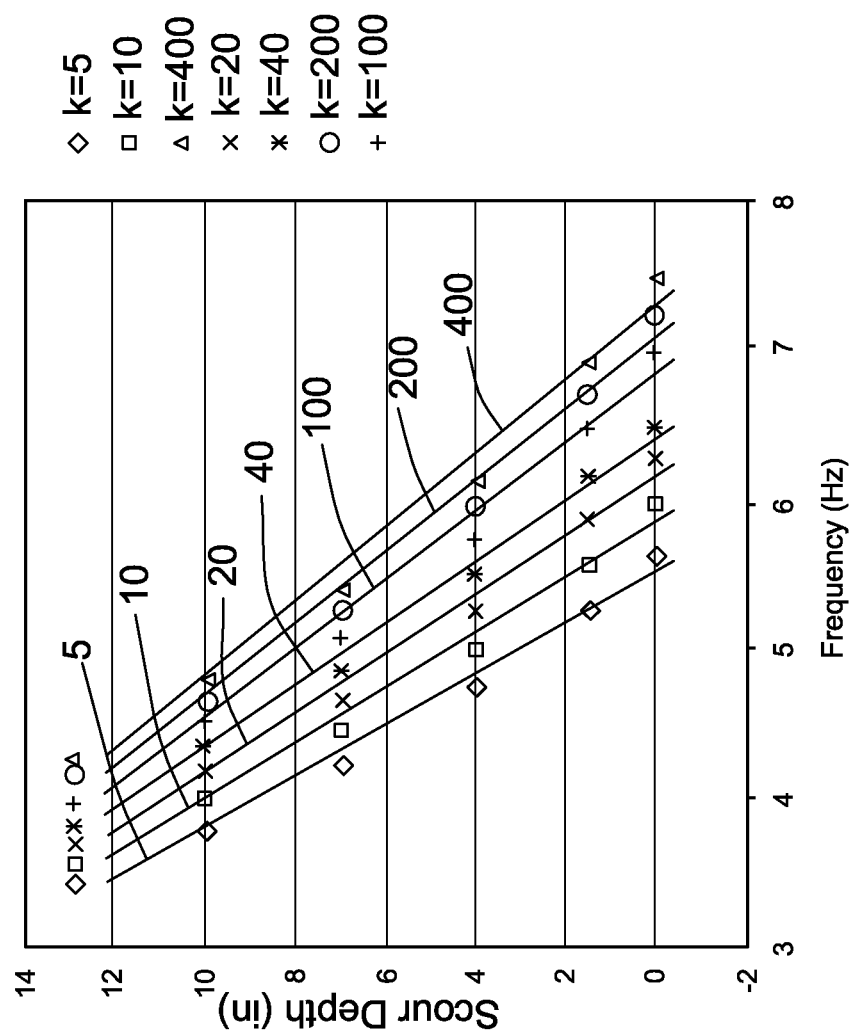
FIG. 14 is a plot of theoretical scour depth versus theoretical natural frequencies for different subgrade moduli.

In FIG. 14, each line represents the theoretical change in the submerged fundamental frequency (i.e. natural frequency) of the sensor as a function of the scour depth for a particular subgrade modulus of the soil (k*). Slope of the individual lines correspond to the theoretical sensor calibration factor for the different soils represented by the k* values. The calibration factors for all the soils modeled in the finite element program are shown in (Table 1).

TABLE 1

| Undisturbed Frequency (Hz) | Calibration Factor |
| --- | --- |
| 5.63 | 5.85 |
| 5.98 | 5.34 |
| 6.3 | 5.02 |
| 6.5 | 4.83 |
| 6.99 | 4.36 |
| 7.24 | 4.16 |
| 7.48 | 3.98 |

However, it should be noted that more or less subgrade modulus values could be modeled, such as to provide improved definition to the data.

The calibration factor correlates changes in the sensed natural frequency to the scour depth for each value of k*. The calibration equation can be obtained from a linear regression.

FIG. 14 illustrates theoretical calibration lines for different values of k* that were used for the present testing to establish calibration factors.

Figure 5:
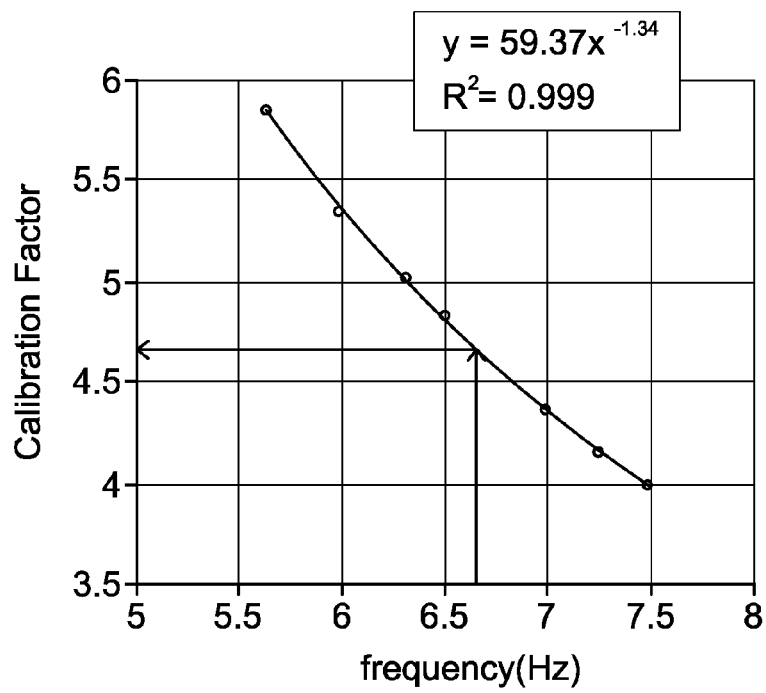
FIG. 5 is chart illustrating the calibration coefficient versus frequency determined from the finite element analysis.

The variation of the calibration factors against the base (benchmark) frequencies corresponding to the undisturbed state of the sensor rod 120 represents the effect of the soil subgrade modulus on the calibration factor. A typical curve indicating the variation of the calibration factor as a function of the subgrade modulus is shown in FIG. 5 and based on the data of Table 1. This numerically computed curve represents the variation in the calibration factor due to the subgrade modulus for a 6 feet long sensor with 0.5 in diameter and an initial embedded length of 3 ft (the initial bedded length can also be referred to as a benchmark depth or base depth). The benchmark depth occurs with zero scour around the rod 120. The sensor calibration procedure involves the finite element analysis determination of the calibration curve according the sensor rod 120 characteristics (e.g. dimensions and material properties) as well as the benchmark depth for a given scour sensor 100. Even when the physical characteristics of the rod 120 remain the same, when different benchmark depths are used, new calibration curves must be generated.

Once the sensor 100 is embedded in the subgrade, i.e. river bed 110, to the benchmark depth, the fundamental natural frequency of the submerged sensor 100 is measured or sampled. At this point, no scour has occurred and the rod 120 is embedded a known depth. This initial installation of the scour sensor 100 represents the base or reference natural frequency (also benchmark frequency) for the original length of the sensor rod 120. The calibration curve in FIG. 5 is then employed to convert the base frequency into the calibration factor which automatically incorporates the effect of the river bed subgrade modulus. This value is recorded as the calibration factor and it is used for estimating the scour depth based on the changes in natural frequency of the scour sensor 100.

Because a benchmark frequency is sampled, the initial setup of the scour sensor 100 can be used to initially determine a subgrade modulus of the soil (k*) proximate the scour sensor 100 and structure 102. More particularly, during initial installation, the depth of embedment is known, the physical properties of the scour sensor 100 are known and zero scour has occurred. Once the natural frequency of the embedded scour sensor 100 is sampled, the only factor that is not known is the subgrade modulus. At this point, the finite element analysis has been performed on the embedded scour sensor 100, or can be performed on the characteristics of the scour sensor 100, based on the scour sensor's characteristics and in a range of potential subgrade moduli, for example between 5 to 400 lb/in$^3$. Once installed, with zero scour, the natural frequency of the sensor can be determined in this initially installed state. Using Table 1 or FIG. 5, a calibration factor based on the sensed natural frequency is determined by correlating this sampled base natural frequency to a theoretical calibration factor for that base natural frequency under the known conditions of scour sensor 100.

Further, using the chart in FIG. 14, that calibration factor can be used to determine the subgrade modulus of the soil (k*). More particularly, the calibration factor will be equal to the slope of a line on FIG. 14.

Using the data of Table 1, if an initial base natural frequency of 6.99 Hz is sensed, a calibration factor of 4.36 will be used for this initial setup. Further, the factor of 4.36 relates to a slope in FIG. 14. From FIG. 14, the line with slope of 4.36 relates to a subgrade modulus k* of 100 lb/in$^3$. Thus, it can be determined from this initial calibration that the subgrade modulus of the soil proximate the sensor is roughly 100 lb/in$^3$.

Alternatively, rather than referring to Table 1, the information in FIG. 14 can be directly used to determine the subgrade modulus k*. In this situation, the user can figure out which curve and data in FIG. 14 most closely passes through or falls on the initial base frequency at a scour depth of zero (0). In this case, FIG. 14 has a data point at a frequency of 6.99 HZ and a scour depth of zero (0). This value relates to the curve for subgrade modulus k* of 100 lb/in$^3$. Thus, this illustrates that either method can be used to determine the subgrade modulus.

In practice, the data table and graphs, such as Table 1 and FIG. 14 would be more detailed and have more subgrade moduli available for the user to more accurately calibrate the scour sensor 100.

Further, it becomes readily apparent that the scour sensor 100 can be used as merely a subgrade modulus sensor for determining the subgrade modulus k* of a soil, whether or not it is in a river or open to the ambient air. All that need be performed to determine a subgrade modulus are the aforementioned calibration steps. More particularly, a user can embed the scour sensor 100 to the predetermined bench mark depth, typically half of the rod length. The user can then sense the undisturbed natural frequency of the scour sensor 120 in its embedded state. The user can correlate the sensed benchmark natural frequency with the data calculated using the finite element modal analysis (e.g. the data in Table 1 and FIGS. 5 and 14) to determine a subgrade modulus. It should be noted, as identified by the theory above, a single sensor could be used for different medium types, e.g. air or water, but that different finite element analysis data must be used to determine the subgrade modulus of the soil in which the sensor 100 is embedded due to the density of any surrounding fluid such as for example air or water. Therefore, all of the aforementioned theory and discussion is directly applicable to the sensor as if it were used as a sensor for sampling subgrade moduli of various materials, such as soils at a construction site.

With regard to scour, once the calibration factor is determined, scour can be determined by applying the calibration factor times a change in natural frequency of the scour sensor 100. The change in frequency is the difference between the base natural frequency (also referred to as the benchmark natural frequency) and the newly or currently sensed natural frequency of the scour sensor 100.

In experimentation that was performed based on a sensor 100 of FIG. 2, the rod 120 was instrumented solely with one sensor element 122 (Fiber Optic Bragg Grating Sensor) which is mounted on the surface of rod 120. The FBG sensor 122 provides the time-domain signal of wavelength which is proportional to the mechanical strain of the rod 120. The Fast Fourier Transform (FFT) on the arbitrarily selected sets of signal points presents the frequency content of the signal in that time interval. The dominant fundamental frequency (the frequency with the maximum power) can be extracted from the FFT power spectrum of each data set. This frequency varies linearly with the change of the scour depth (d). As discussed earlier, this concept constructs the principal idea of the proposed sensor 100 for measuring the scour depth (d) near structures 102.

A computer program was developed in the Lab-View software to perform FFT and for the computation of the fundamental frequency for the time domain data points in real time. The calibration factor obtained from the calibration test was employed in the computer program to plot the scour depth in real-time. A calibration curve similar to the one shown in FIG. 5 can be programmed into the software knowing that the curve is for a particular sensor design and medium above the subgrade in which the sensor 100 is installed. Further, the software could be programmed to include the subgrade moduli values (k*) so that the software can automatically relate to the user the subgrade moduli (k*) upon initial calibration. It also has a user-interface platform for setting parameters, changing calibration and sensor length data, etc.

Proof of Concept Tests

Figure 6:
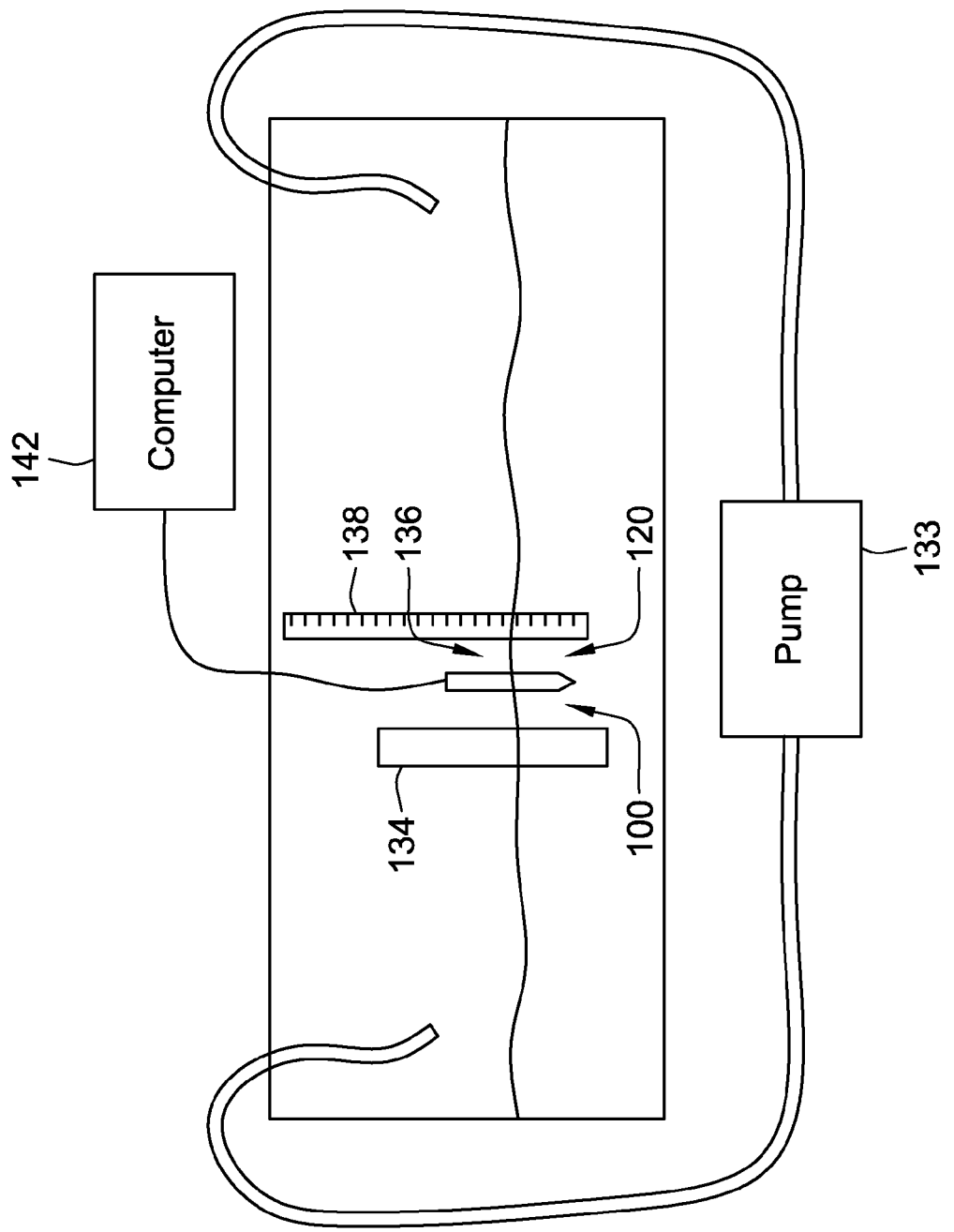
FIG. 6 is a schematic representation of a lab set-up used to test the efficacy of embodiments of the instant invention.

The experimental setup shown schematically in FIG. 6 was used to test the concept, using a hydraulic pump setup 133 and the discharge unit 130 to create a closed-loop flow through the tank 132. No efforts were made to create any river flow simulations. The idea was to examine the viability of the concept and to correlate the frequency response to scour depth. The scour sensor 100 was installed in the vicinity of the concrete cylinder 134 where the local scour is taken place.

First, a series of tests were done by removal of soil materials 136 and observing the frequency response. Once it was ascertained that the theory was sound, careful calibration experiments were performed by embedding a graduated ruler 138 inside the sand 136. Through manual removal as well as re-deposition of sand to simulate scour, the physical measurements by the ruler were calibrated against the frequency changes. The software was loaded in a laptop computer 142 and attached to the fiber optic interrogation unit (not shown) and the sensor attached to the interrogation unit for reading the fiber optic sensor signals.

Preliminary Results

Figure 7:
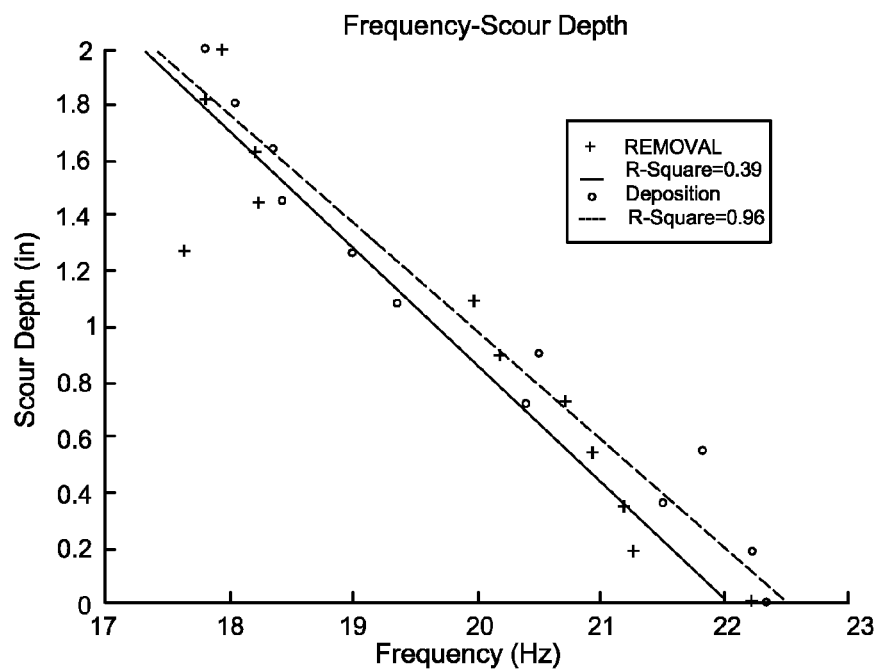
FIG. 7 is plot of lab results of a model of a scour sensor according to an embodiment of the teachings of the present invention.
Figure 8:
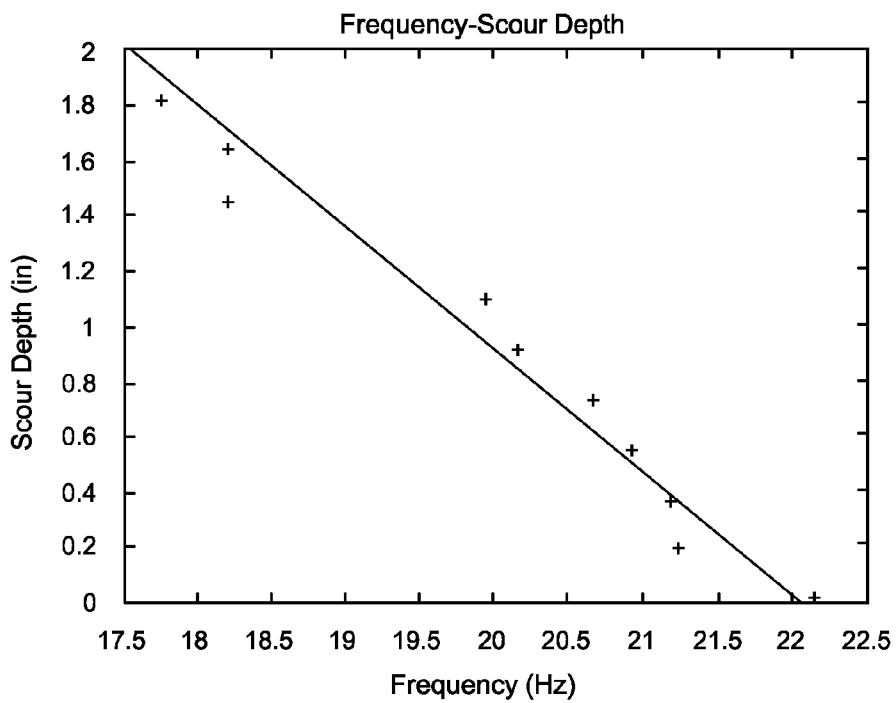
FIG. 8 is the plot of FIG. 7 removing an extreme outlier in the data.

The removal/deposition calibration results (raw data) is shown in FIG. 7. FIG. 7 is the measured fundamental frequency of the sensor rod against the carefully measured scour depth (d) by the graduated ruler 138. The linear regression lines for the removal (illustrated as cross-hairs) and the deposition (illustrated as dots) relationships were computed separately, as shown in FIG. 7. As noticed, there is an outlier data point, which only occurred once and it is considered a noise related error, but the outlier was not removed in this calibration. Despite the individual outlier, the R-squared correlations are 0.89 and 0.96 for the removal and the deposition curves, respectively. However, if the single outlier is removed, as shown in FIG. 8, the data for the removal will be greatly enhanced and an R-squared value of 0.96 will be achieved which is similar to the deposition correlation relationship.

Sensor Design and Fabrication

After visiting several scour critical bridges over area rivers and consulting with Department of Transportation inspection personnel, a bridge was selected for the primary field experiments. The real time data summary of the United States Geological Survey (USGS) website was employed for determination of the maximum river flow rate at the selected bridge. The design flow rate was selected for the period between May 1 and July 1. The prevailing flow rate during this period was around 700 cubic feet per second. This flow rate was employed in the design of the sensor 100. Considering the behavior of a rod driven inside the river bed, it was decided to design the scour sensor as a friction pile in order to evaluate the response and the stability of the scour sensor. AASHTO specifications were used for the scour sensor design.

It is preferable for the scour sensor 100 to be completely submerged inside the body of water 104, i.e. the medium above the subgrade being monitored. In such a case, it is possible to establish a reference calibration factor based on the fully submerged state of the sensor. Further, the variations in the frequency obtained from the sensor vibration is exclusively due to scour. For the first trial a 6 feet aluminum rod with 0.5 in diameter was considered. The sensor rod 120 was embedded within the river-bed soil with an embedded length of 3 feet. A schematic sketch of the sensor 100 is demonstrated in FIG. 2, and more fully discussed above. However, due to water levels, additional trials were conducted using sensors having a shorter length, see Table 2 produced below.

Field Installment, Test and Results

Figure 9:
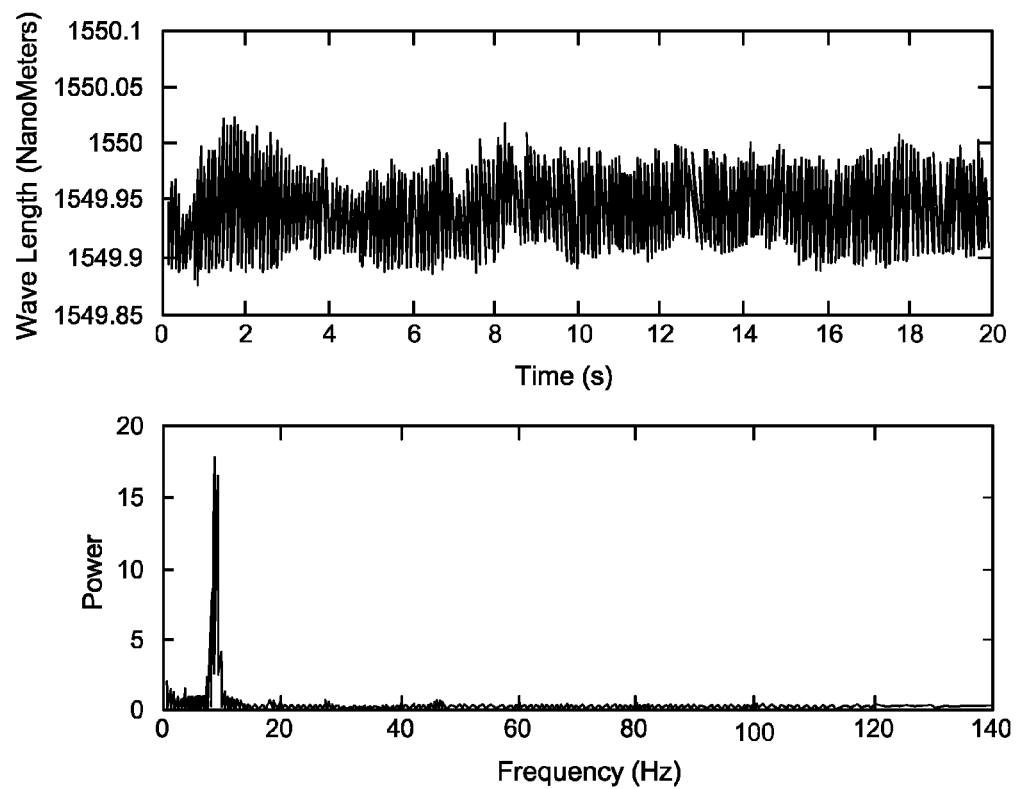
FIG. 9 is a plot of data gathered from an experimental test of a scour sensor implemented in a river.

In the field, the sensor 100 was driven inside the soil by several beats of a hammer on the top of rod 120. Collected vibration data indicated excellent results in terms of vibration chacrateristics and prediciton of vibration frequency matching the finite element results. The frequency was obtained through the Fast Fourier Transform (FFT) on the collected sets of time domain signals representing the frequency content of the signal in that time interval. FIG. 9 shows a typical signal and its frequency content.

Figure 15:
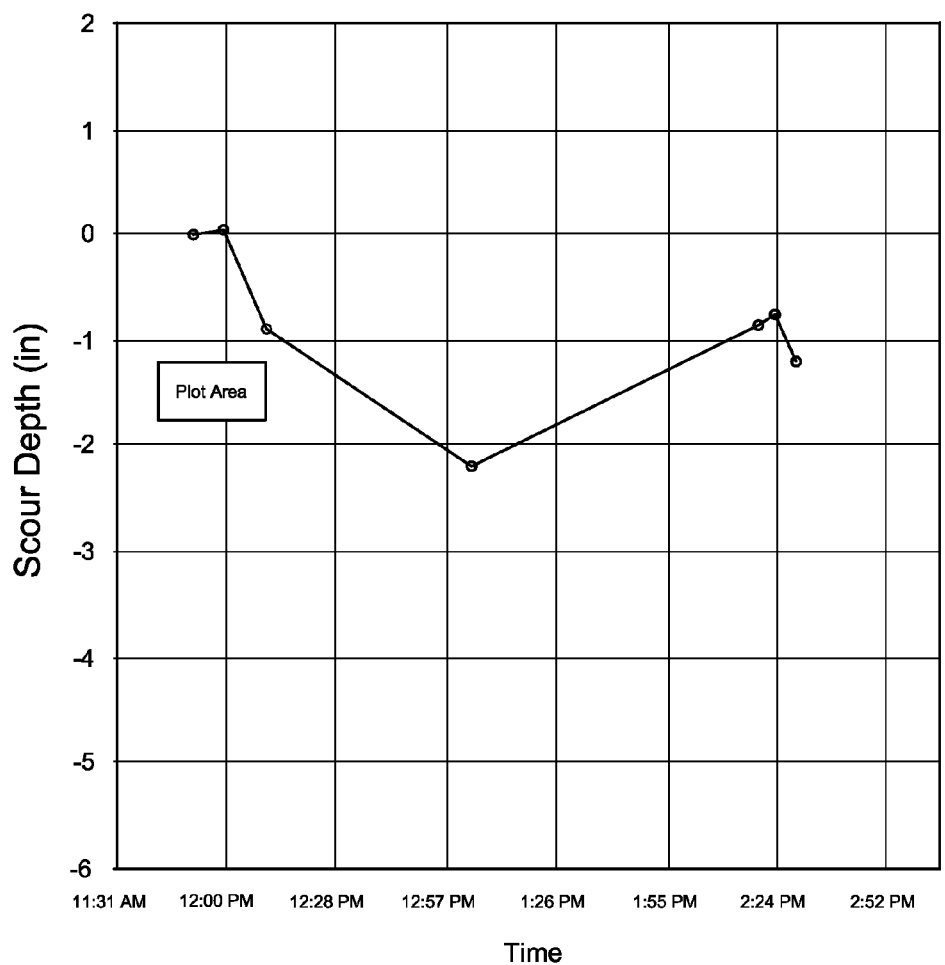
FIG. 15 is a plot of experimentally captured scour data over time.

Throughout the day, data was collected in real-time, and seven data sets were saved. The first data set was employed to establish calibration and the reference frequency of the sensor 100. The reference frequency was employed in a manner described with reference to FIG. 5 to establish the calibration factor. Subsequently this calibration factor was employed to compute the scour depth which is automatically done by the real-time software. The scour depth predicted by this sensor 100 is plotted in FIG. 15. As shown in FIG. 15, the sensor 100 resolution for the scour activity was within an inch.

During additional testing, three sensors 100, 100', 100" (see FIG. 10) of different dimensions were fabricated and installed at the same bridge site. Sensors 100, 100' and 100" are also referred to as Sensor 2, Sensor 1 and Sensor 3, respectively. Table 2 presents the sensors dimensions and the water level with respect to the reference point at the river bed.

TABLE 2

| Sensor No. | Total Length (in) | Exposed to Water Length (in) | Water Level (in) |
|---|---|---|---|
| 1 | 48 | 17 | 20 |
| 2 | 72 | 36 | 23 |
| 3 | 48 | 24 | 24.5 |

Figure 10:
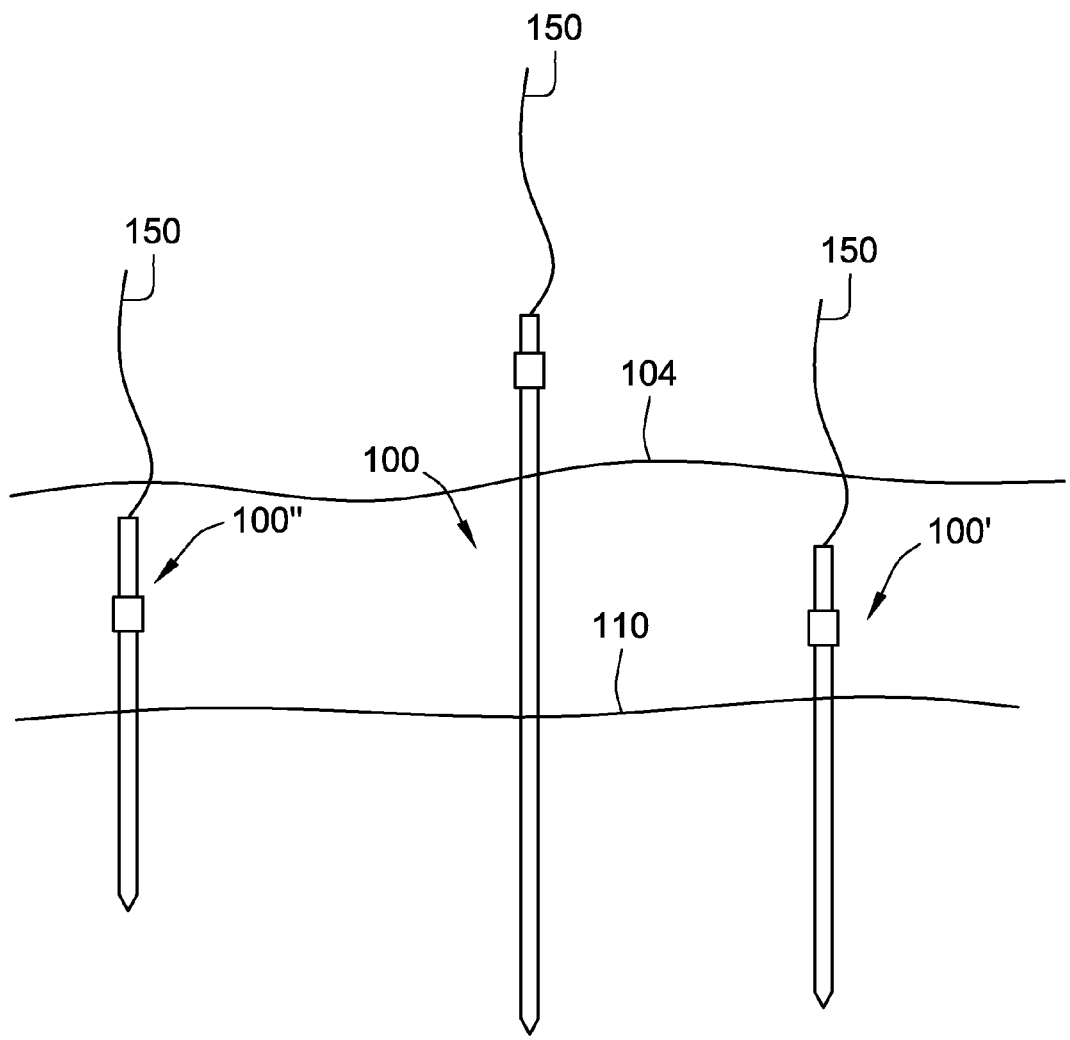
FIGS. 10 and 11 are schematic representations test set-ups of various scour sensors positioned within a river for testing purposes.
Figure 11:
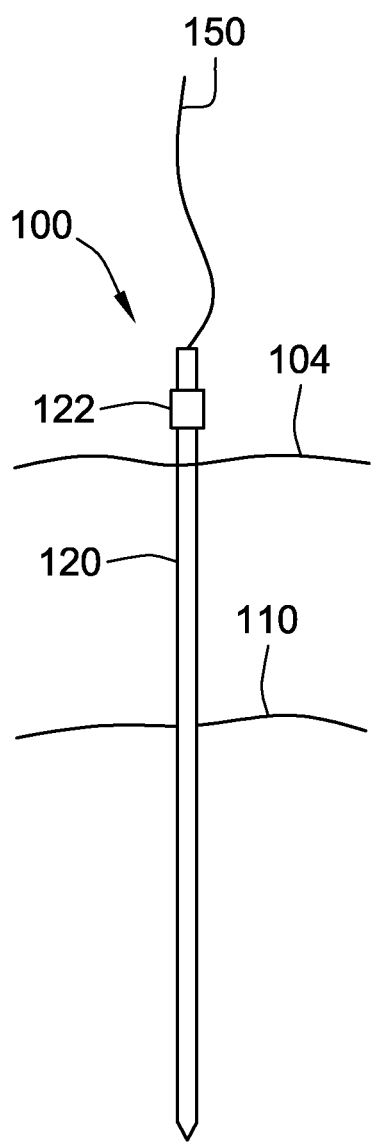

Two of the sensors 100' and 100" were totally submerged in the river (identified generally as 100' and 100" in FIG. 10). The 6 feet sensor (labeled with reference numeral 100) was partially submerged and thus no test data was provided. However, the use of various height sensors may be beneficial in that the longer sensors can be used later for scour monitoring during and after floods (such as for example sensor 100 in FIG. 11). During the various water levels, the data collected from all the three sensors illustrated the existence of a constant vibration frequency.

The testing involved sensor calibrations according to the method described earlier and examination of the sensor scour detection capabilities by unearthing the soil around the scour sensors 100, 100', 100" artificially mimicking scour activity. The sensors 100, 100', 100" were calibrated at the river site by measuring the first fundamental frequency of the sensors and using the calibration curve procedure in a manner similar to the one established using FIG. 5 and illustrated in FIG. 12 for the particular sensor and the river bed subgrade modulus.

Following the calibration process, the earth around the sensors 100, 100', 100" was removed in steps and each time a graduated long ruler was employed for measuring the scour depth (d). For each height, the corresponding frequency was extracted out of the saved data. While measurements with the graduated ruler were not highly accurate as it was not possible to exactly see the depth in the murky water, the experimental data was sufficiently acceptable to prove the field calibration and measurement concept. The frequency change due to scour action as captured by the automated data acquisition system was automatically converted to the scour depth on the computer screen in real time.

Figure 13:
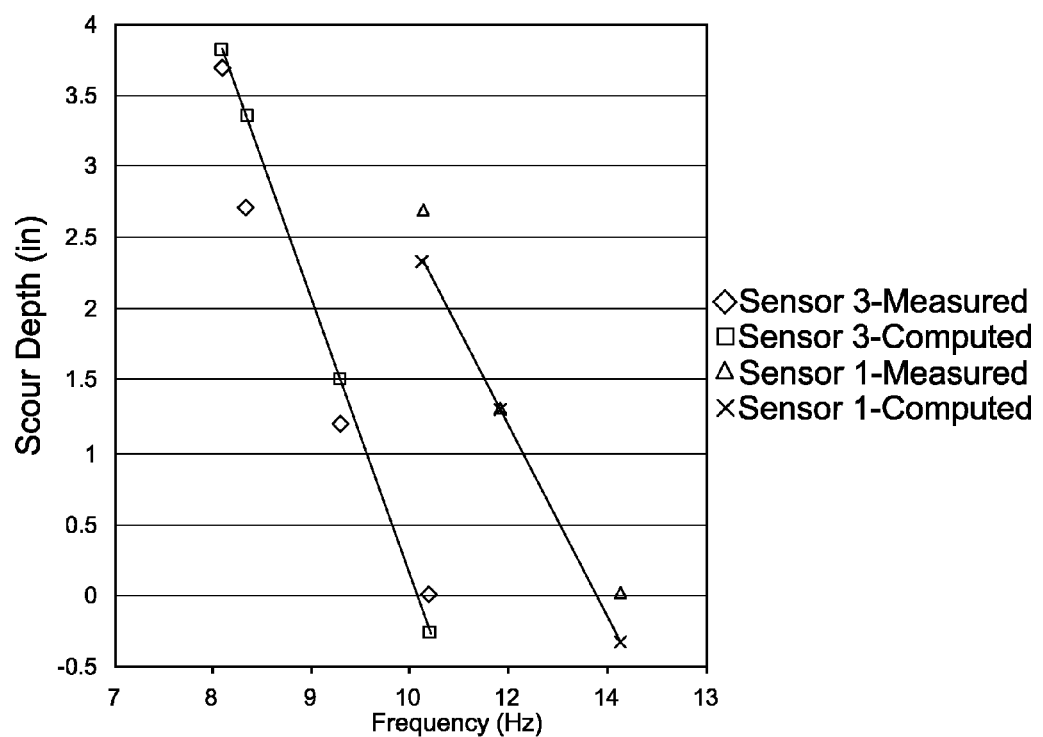
FIG. 13 is a comparison of actual test data from the sensors in FIG. 10 compared with computed data.

Tables 3 and 4 as well as FIG. 13 provide a comparison between the ruler-measured scours in the field and the amounts predicted by the finite-element-based calibration factors. Table 3 and 4 illustrate the variation of frequency against artificially-created scour for sensors 1 (100') and 3 (100") as well as the computed scour depth.

TABLE 3

| Sensor 1 (100') | | |
|---|---|---|
| Frequency (Hz) | Scour Depth (in) | Computed Scour Depth (in) |
| 12.13 | 0 | −0.33485 |
| 10.93 | 1.3 | 1.27915 |
| 10.14 | 2.7 | 2.3417 |

TABLE 4

| Sensor 3 (100") | | |
|---|---|---|
| Frequency (Hz) | Scour Depth (in) | Computed Scour Depth (in) |
| 10.2094 | 0 | −0.2674924 |
| 9.3 | 1.2 | 1.5022 |
| 8.35 | 2.7 | 3.3509 |
| 8.11 | 3.7 | 3.81794 |

Figure 12:
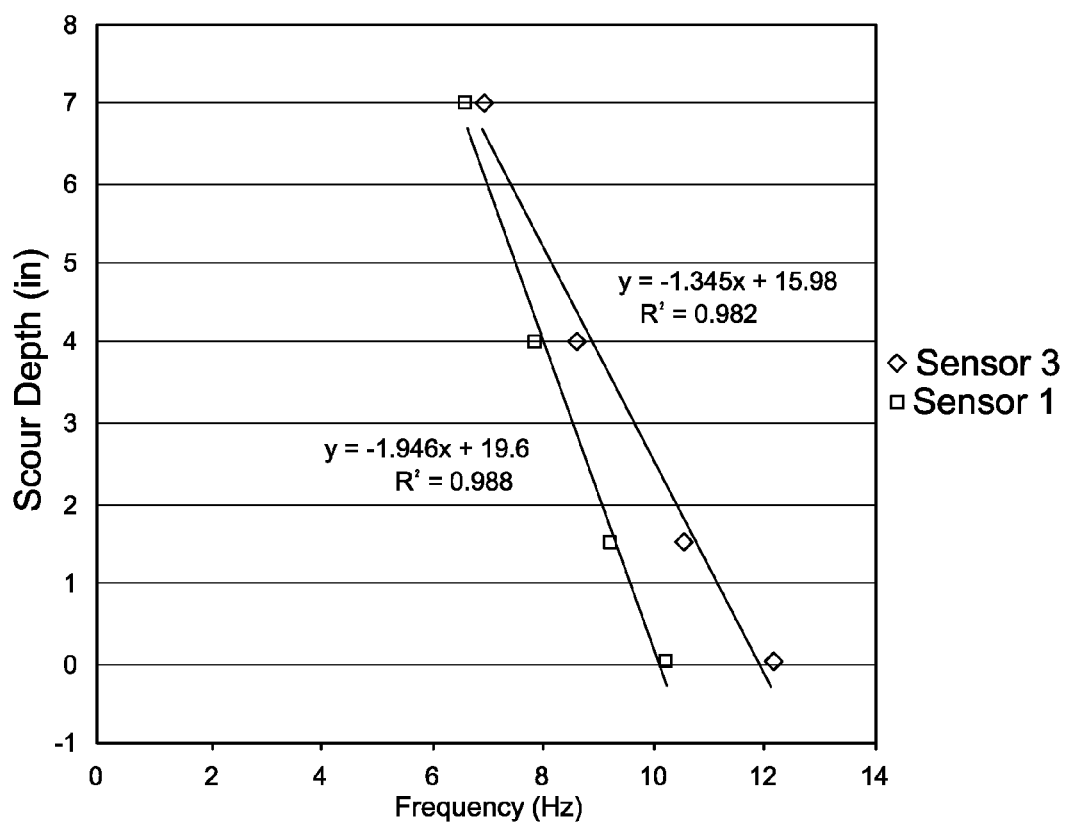
FIG. 12 is a graph of finite element analysis performed on two of the sensors used in the actual tests preformed using the sensors in FIG. 10.

In the finite element models of the sensors 100, 100', 100", through a trial and error procedure, the amount of k* was varied so that the natural frequencies of the submerged rods 120 mimicked the measured undisturbed frequencies of the sensors 100, 100', 100". For each sensor 100, 100', 100" the modal analysis was carried out for different embedment lengths by utilizing the calculated k* (FIG. 12).

As can be seen, there is good correlation between the measured data as compared to the predicted data. Thus, the scour sensor 100 of the present invention will function to monitor the scour of a river bed 110. Thus, a cheap and simple scour sensor 100 can be constructed that is easy to install in the river bed 100 as well as easy to calibrate. By utilizing only a single sensing element 122, the data collection is simple and utilizes reduced power requirements. Further, simple field calibration can be used to calibrate the sensor 100 for various subgrade conditions without needing to disturb the subgrade in which the scour sensor 100 is installed. This finds practical applications for measuring scour as well as being able to directly determine, without significant disruption to the subgrade, the subgrade moduli of the soil for use in more than merely water/scour environments All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sensor for monitoring scour and subgrade modulus above or below a body of water or in air, the sensor comprising:
    an elongated rod;
    a sensor element mounted to the rod, the sensor element operably monitoring a desired dynamic characteristic of the rod, the desired dynamic characteristic varying depending on the amount of scour and the subgrade modulus around the rod; and
    a controller programmed to correlate frequency data from the sensor element into scour depth and the subgrade modulus of the subgrade.

2. The sensor of claim 1, wherein the controller is programmed with theoretical benchmark frequencies for the elongated rod embedded a benchmark depth in various subgrades having various subgrade moduli, respectively, and is configured to compare the data from the sensor element with the theoretical benchmark frequencies to determine the scour and subgrade modulus of the subgrade in which the elongated rod is embedded.

3. A method of monitoring scour or subgrade modulus comprising the steps of:
    inserting an elongated rod into the subgrade either fully submerged in a body of water or in air;
    monitoring changes in a dynamic characteristic of the elongated rod; and
    calibrating a sensor that is the elongated rod partially embedded into the subgrade, the sensor having known physical properties, wherein calibrating the sensor comprises:
        embedding a first portion of the sensor a predetermined benchmark depth into the subgrade;
        sampling a benchmark frequency of the sensor with the first portion of the sensor embedded at the predetermined benchmark depth; and
        selecting a calibration factor based on the sampled benchmark frequency of the sensor embedded at the predetermined benchmark depth.

4. The method of claim 3, wherein the step of embedding a first portion of the sensor includes leaving a second portion of the sensor unembedded and fully exposed to the medium above the subgrade and fully submerged within the medium.

5. The method of claim 3, wherein the step of selecting a calibration correlation relationship includes comparing the sampled benchmark frequency to theoretical benchmark frequency data for the sensor, for various subgrades, each subgrade having a different subgrade modulus.

6. The method of claim 5, wherein the theoretical benchmark frequency data is compensated for a medium exposed to a second portion of the sensor that is not embedded into the subgrade.

7. The method of claim 6, further comprising the step of performing finite element analysis on the sensor to establish the theoretical benchmark frequency data including determining the theoretical benchmark frequency of the sensor when the sensor is embedded in the various subgrades at varying benchmark depths.

8. The method of claim 7, further comprising the step of establishing a correlation relationship for the various subgrade moduli including the step of determining the change in the theoretical benchmark frequencies against various subgrade moduli.

9. The method of claim 3, further comprising the step of determining theoretical benchmark frequency data for the sensor based on the sensor embedded various benchmark depths into a subgrade having a subgrade modulus.

10. The method of claim 9, wherein the step of determining theoretical benchmark frequency data includes modeling the subgrade surrounding the sensor within the embedded length as a Winkler reaction spring system with known physical properties of the sensor.

11. The method of claim 9, further comprising the step of establishing a calibration relationship by correlating the theoretical benchmark frequency data against the corresponding theoretical benchmark depths, the calibration correlation relationship being the change in theoretical benchmark frequency against the change in corresponding benchmark depth, for each subgrade modulus and sensor, respectively.

12. The method of claim 11, further comprising the step of using the calibration correlation relationship with sensed vibration frequencies of the sensor to determine a change in the amount that the sensor is embedded in the subgrade.

13. The method of claim 3, wherein the step of sampling the benchmark frequency is performed by either a strain gage or an accelerometer.

* * * * *